(12) United States Patent
Larson et al.

(10) Patent No.: US 10,995,808 B1
(45) Date of Patent: May 4, 2021

(54) SOLENOID/MAGNETIC HOLD BRAKE WITH POWER OFF MAGNET HOLD FUNCTION

(71) Applicant: GOODRICH CORPORATION, Charlotte, NC (US)

(72) Inventors: Wallace Harold Larson, Jamestown, ND (US); Scott Harms, Ypsilanti, ND (US)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 16/717,582

(22) Filed: Dec. 17, 2019

(51) Int. Cl.
| | |
|---|---|
| *F16D 65/18* | (2006.01) |
| *B65G 13/075* | (2006.01) |
| *B65G 13/071* | (2006.01) |
| *B64D 9/00* | (2006.01) |

(52) U.S. Cl.
CPC ............ *F16D 65/183* (2013.01); *B64D 9/00* (2013.01); *B65G 13/071* (2013.01); *B65G 13/075* (2013.01); *B64D 2009/006* (2013.01)

(58) Field of Classification Search
CPC ... F16D 65/183; B64D 9/00; B64D 2009/006; B65G 13/071; B65G 13/075
USPC ................................ 198/782, 788; 193/35 A
See application file for complete search history.

(56) References Cited

U.S. PATENT DOCUMENTS

| | | | |
|---|---|---|---|
| 5,183,150 A | 2/1993 | Chary et al. | |
| 5,716,028 A * | 2/1998 | Evans | B64D 9/00 |
| | | | 244/137.1 |
| 6,420,846 B1 * | 7/2002 | Wolfe | B64D 9/00 |
| | | | 198/780 |
| 6,612,422 B2 | 9/2003 | Roberts et al. | |
| 9,889,990 B2 * | 2/2018 | Dimitrov | B65G 13/06 |
| 10,023,387 B2 | 7/2018 | Harms et al. | |

* cited by examiner

*Primary Examiner* — Gene O Crawford
*Assistant Examiner* — Lester Ill Rushin
(74) *Attorney, Agent, or Firm* — Snell & Wilmer LLP (57) ABSTRACT

A PDU for use in an aircraft includes a wheel configured to convey cargo through a portion of the aircraft. The PDU further includes an armature rotatably coupled to the wheel. The PDU further includes a brake pad. The PDU further includes a hold solenoid configured to compress the armature against the brake pad by a brake amount in order to apply a hold braking force to the wheel by resisting rotation of the armature. The PDU further includes a release solenoid configured to apply a force to separate the armature from the brake pad in order to allow the armature to rotate. The PDU further includes a magnet configured to compress the armature against the brake pad by a drag amount that is less than the brake amount in order to apply a drag braking force to the wheel by resisting rotation of the armature.

20 Claims, 5 Drawing Sheets

SOLENOID/MAGNETIC HOLD BRAKE WITH POWER OFF MAGNET HOLD FUNCTION

FIELD

The present disclosure is directed to cargo loading systems for aircraft and, more particularly, to a power drive unit (PDU) designed to provide a magnetic hold braking function.

BACKGROUND

Aircraft may transport at least one of passengers or cargo. Many aircraft thus have at least one cargo bay designed to receive cargo. Such cargo bays include cargo loading systems that include rollers located on a floor of the cargo bay along with power drive units (PDUs) that provide propulsion to drive a unit load device (ULD, cargo) through the cargo bay. Occasionally, power may be disturbed during loading of a cargo bay. In such situations, the PDU may either operate in a fully braked state in which the ULD cannot be manually pushed off the PDU or an open state in which the ULD may freely roll across the PDU or in a drag state where a ULD may be manually pushed over the ULD.

SUMMARY

Described herein is a power drive unit (PDU) having a magnetic hold brake for use in an aircraft. The PDU includes a wheel configured to convey cargo through a portion of the aircraft. The PDU further includes an armature rotatably coupled to the wheel. The PDU further includes a brake pad. The PDU further includes a hold solenoid configured to compress the armature against the brake pad by a brake amount in order to apply a hold braking force to the wheel by resisting rotation of the armature. The PDU further includes a release solenoid configured to apply a force to separate the armature from the brake pad in order to allow the armature to rotate. The PDU further includes a magnet configured to compress the armature against the brake pad by a drag amount that is less than the brake amount in order to apply a drag braking force to the wheel by resisting rotation of the armature.

In any of the foregoing embodiments, the hold solenoid is configured to compress the armature against the brake pad in response to receiving a first electrical signal; the release solenoid is configured to apply the force to separate the armature from the brake pad in response to receiving a second electrical signal; and the magnet is configured to compress the armature against the brake pad regardless of whether any element of the PDU is receiving power.

In any of the foregoing embodiments, the hold braking force is greater than the drag braking force.

Any of the foregoing embodiments may further include a motor configured to generate torque; and a motor shaft coupled to the motor and the armature and configured to transfer the torque from the motor to the armature.

In any of the foregoing embodiments, the hold braking force is sufficient to resist rotation of the wheel regardless of whether the torque is transferred from the motor to the armature.

In any of the foregoing embodiments, the hold solenoid further includes a hold solenoid coil and a hold solenoid housing, and the hold solenoid coil and the magnet are located in the hold solenoid housing.

In any of the foregoing embodiments, the hold solenoid is positioned about an axis of rotation, and the magnet is located radially inward from the hold solenoid coil.

In any of the foregoing embodiments, the brake pad and the armature are sandwiched between the hold solenoid and the release solenoid.

In any of the foregoing embodiments, the hold solenoid is configured to compress the armature against the brake pad by applying a first magnetic flux to the armature to compress the brake pad between the armature and the hold solenoid; and the release solenoid is configured to apply the force to separate the armature from the brake pad by applying a second magnetic flux to the armature to urge the armature away from the brake pad.

Also disclosed is a power drive unit (PDU) having a magnetic hold brake for use in an aircraft. The PDU includes a wheel configured to convey cargo through a portion of the aircraft. The PDU further includes an armature rotatably coupled to the wheel. The PDU further includes a brake pad. The PDU further includes a hold solenoid configured to compress the armature against the brake pad in order to apply a hold braking force to the wheel by resisting rotation of the armature. The PDU further includes a release solenoid configured to apply a force to separate the armature from the brake pad in order to allow the armature to rotate. The PDU further includes a magnet configured to compress the armature against the brake pad in order to apply a drag braking force to the wheel by resisting rotation of the armature, the hold braking force being greater than the drag braking force.

In any of the foregoing embodiments, the hold solenoid is configured to compress the armature against the brake pad in response to receiving a first electrical signal; the release solenoid is configured to apply the force to separate the armature from the brake pad in response to receiving a second electrical signal; and the magnet is configured to compress the armature against the brake pad regardless of whether any element of the PDU is receiving power.

Any of the foregoing embodiments may further include a motor configured to generate torque; and a motor shaft coupled to the motor and the armature and configured to transfer the torque from the motor to the armature.

In any of the foregoing embodiments, the hold braking force is sufficient to resist rotation of the wheel regardless of whether the torque is transferred from the motor to the armature.

In any of the foregoing embodiments, the hold solenoid further includes a hold solenoid coil and a hold solenoid housing, and the hold solenoid coil and the magnet are located in the hold solenoid housing.

In any of the foregoing embodiments, the hold solenoid is positioned about an axis of rotation, and the magnet is located radially inward from the hold solenoid coil.

In any of the foregoing embodiments, the brake pad and the armature are sandwiched between the hold solenoid and the release solenoid.

In any of the foregoing embodiments, the hold solenoid is configured to compress the armature against the brake pad by applying a first magnetic flux to the armature to compress the brake pad between the armature and the hold solenoid; and the release solenoid is configured to apply the force to separate the armature from the brake pad by applying a second magnetic flux to the armature to urge the armature away from the brake pad.

Also disclosed is a power drive unit (PDU) having a magnetic hold brake for use in an aircraft. The PDU, in various embodiments, includes a wheel configured to convey cargo through a portion of the aircraft. The PDU further includes an armature rotatably coupled to the wheel. The PDU further includes a motor configured to generate torque. The PDU further includes a motor shaft coupled to the motor and the armature and configured to transfer the torque from the motor to the armature. The PDU further includes a brake pad. The PDU further includes a hold solenoid having a hold solenoid housing and a hold solenoid coil located in the hold solenoid housing and configured to compress the armature against the brake pad by a brake amount in order to apply a hold braking force to the wheel by resisting rotation of the armature. The PDU further includes a release solenoid configured to apply a force to separate the armature from the brake pad in order to allow the armature to rotate. The PDU further includes a magnet located in the hold solenoid housing and configured to compress the armature against the brake pad by a drag amount that is less than the brake amount in order to apply a drag braking force to the wheel by resisting rotation of the armature.

In various embodiments, the hold solenoid is configured to compress the armature against the brake pad in response to receiving a first electrical signal; the release solenoid is configured to apply the force to separate the armature from the brake pad in response to receiving a second electrical signal; and the magnet is configured to compress the armature against the brake pad regardless of whether any element of the PDU is receiving power.

In any of the foregoing embodiments, the hold solenoid is positioned about an axis of rotation, and the magnet is located radially inward from the hold solenoid coil.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
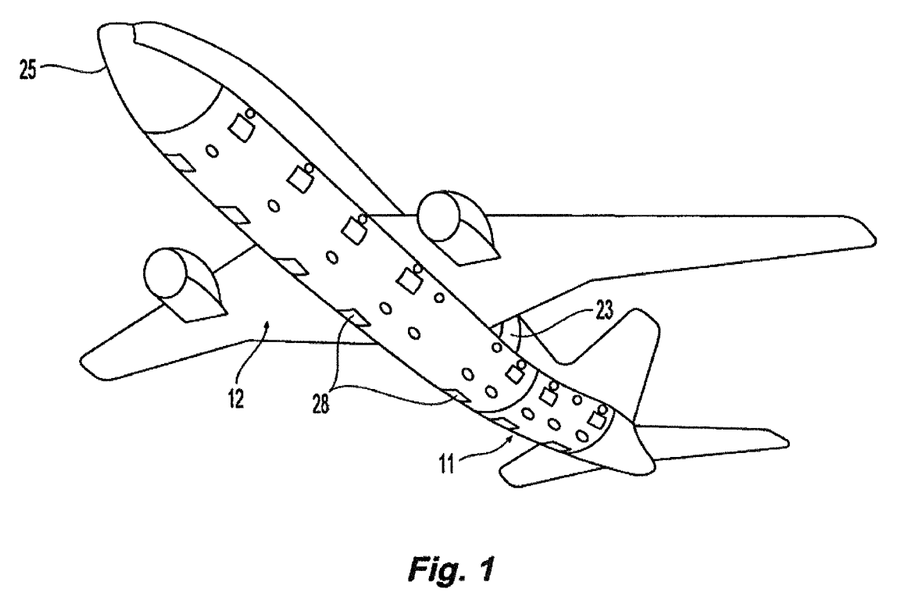
FIG. 1 illustrates an underside of an aircraft, in accordance with various embodiments.
Figure 2:
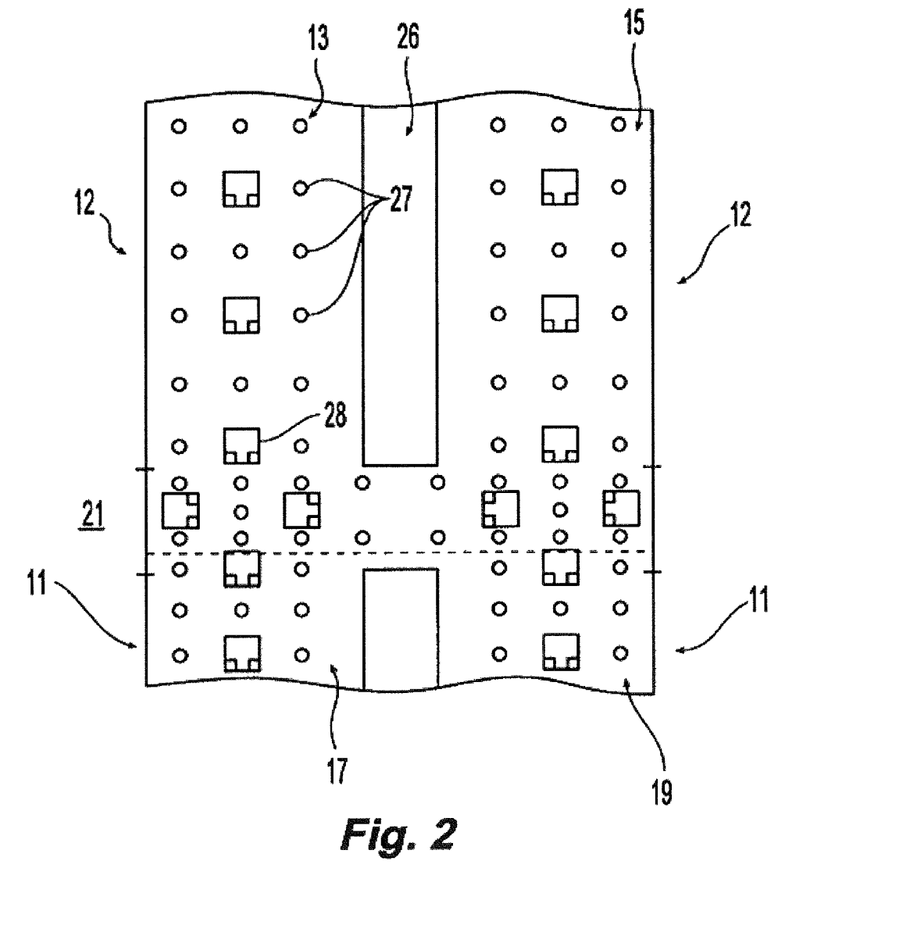
FIG. 2 illustrates an aircraft cargo deck, in accordance with various embodiments.

FIG. 1 illustrates an underside of an aircraft 25 and FIG. 2 illustrates an aircraft cargo deck 29 that can be used to implement various embodiments of the present disclosure. A generally H-shaped conveyance surface 26 forms a deck of an aircraft, adjacent a cargo bay loading door 23. However, there are many other aircraft cargo deck configurations to which the embodiments of the disclosure can be implemented. For example, various aircraft, particularly those configured primarily for the transportation of cargo without passengers, have the upper passenger deck removed and an additional larger cargo deck installed. Other aircraft may have three or more parallel longitudinal tracks rather than the H-shape shown in FIG. 2.

The cargo compartment includes a cargo loading system comprising a plurality of freely rotating conveyance rollers 27 mounted in the cargo deck to define the conveyance plane. Cargo loaded onto the aircraft cargo deck can be moved manually throughout the cargo bay upon the freely rotating conveyance rollers. However, it is desirable to electro-mechanically propel the cargo with minimal or no manual assistance. In that regard, the H-shaped cargo surface includes a number of power drive units (PDUs) 28 that provide a mechanism upon which cargo is propelled over the conveyance rollers 27. Each PDU 28 typically includes a drive roller element which can be raised from a lowered position beneath the cargo deck to an elevated position. These PDUs are referred to as "self-lift" PDUs. In the elevated position, the drive roller element contacts and drives the overlying cargo that rides on the conveyance rollers. Other types of PDUs, which can also be used as embodiments of the present disclosure, are above the conveyor plane all the time and held up by a spring or other mechanism. These PDUs are referred to as "spring-lift" PDUs.

In the longitudinal direction, the H-shaped conveyance surface 26 includes a left track and a right track along which cargo is to be stowed in parallel columns during flight. In the transverse direction, the cargo deck is also separated into a tail (or "aft") section 11 and a forward section 12. Thus, the left and right tracks are divided into four sections, two forward sections 13 and 15 and two aft sections 17 and 19. In addition to the four sections, there is an additional path 21 between both tracks at the cargo bay loading door 23. This additional path 21 divides the cargo bay between the forward section 12 and the aft section 11. This path is used to move cargo into and out the aircraft 25, and also to transfer cargo between the left and right storage tracks.

In various embodiments, an operator may manipulate control elements to selectively and electrically energize PDUs 28 in each of the five aforementioned sections 13, 15, 17, 19 and 21. Typically, these controls are mounted in an operator interface unit. The control elements may be mounted on a wall or other structure within the cargo bay or may be portable, e.g., the controls may be in a hand-held device. These controls will typically have an on/off switch and a joystick which, depending on the direction pushed, will energize a set of PDUs 28, causing groups of drive roller elements to be elevated (if not already elevated) and rotated in one of two possible directions (i.e., forward or reverse). A section of PDUs will remain energized as long as the joystick is held in a corresponding position. In response to release of the joystick, the selected set of PDUs is de-energized. In the case of self-lifting PDUs, the drive roller elements are returned to their retracted position below the plane of the conveyance rollers 27; in the case of spring-lift PDUs, the PDUs remain biased in the upward position and brakes are applied to hold the cargo containers in place.

Figure 3:
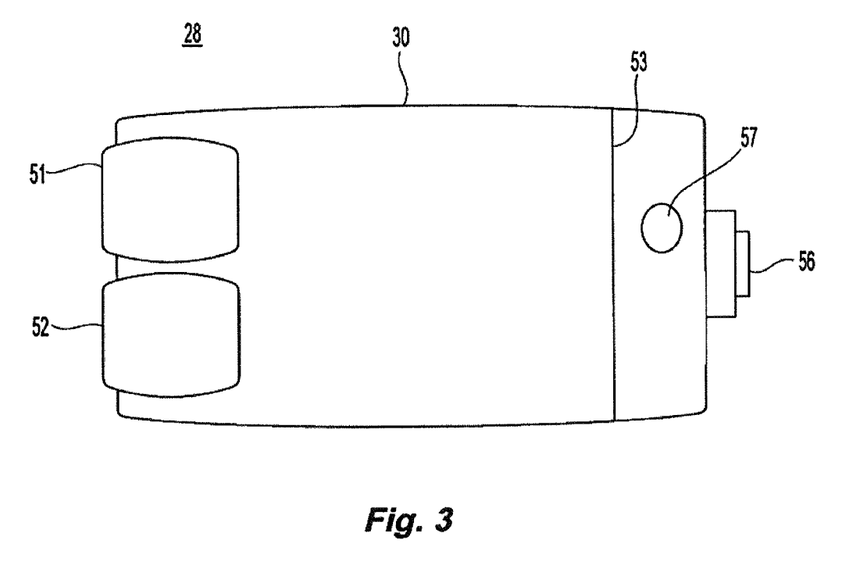
FIG. 3 is a top view of a power drive unit (PDU) used in the aircraft cargo deck of FIG. 2, in accordance with various embodiments.
Figure 4:
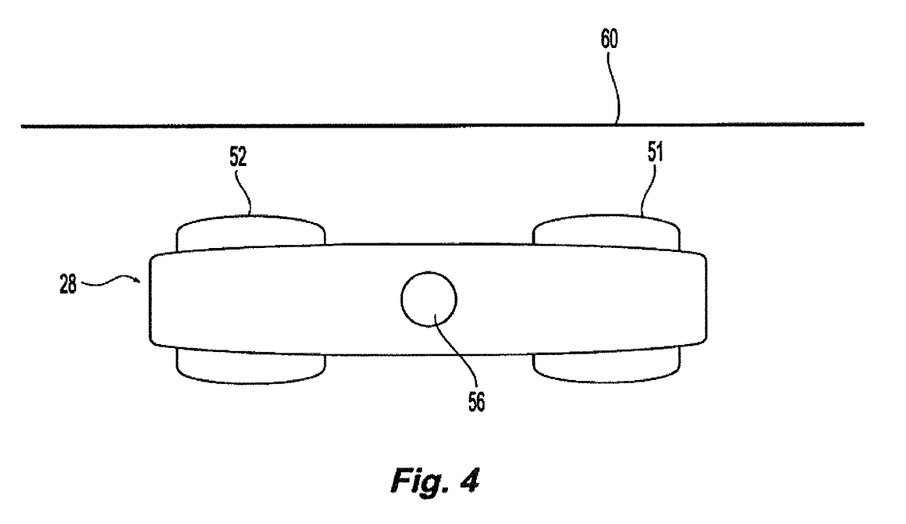
FIG. 4 is an end view of the PDU of FIG. 3, in accordance with various embodiments.

Referring to FIGS. 3 and 4, FIG. 3 shows a top view of a PDU 28 and FIG. 4 shows an end view of the PDU 28, in accordance with various embodiments of the present disclosure. The PDU 28 includes a housing 30 which incorporates a pair of wheels 51 and 52 that function as drive roller elements. The wheels 51 and 52 are coupled to a drive shaft. The PDU 28 further includes motor and gear assemblies and other related components for turning and/or raising wheels 51 and 52 so that the wheels 51 and 52 are positioned above the cargo deck and are able to contact the bottom of a unit load device (ULD) and drive the ULD.

The PDU 28 may further include an electronics cavity that is separated from the rest of the PDU by a wall 53 for housing various electronics, such as a controller 57, and includes an electrical connector 56 for coupling the electronics to a power source and a control source. In various embodiments, the controller 57 may be located at any location within or otherwise coupled to the housing 30.

Figure 5:
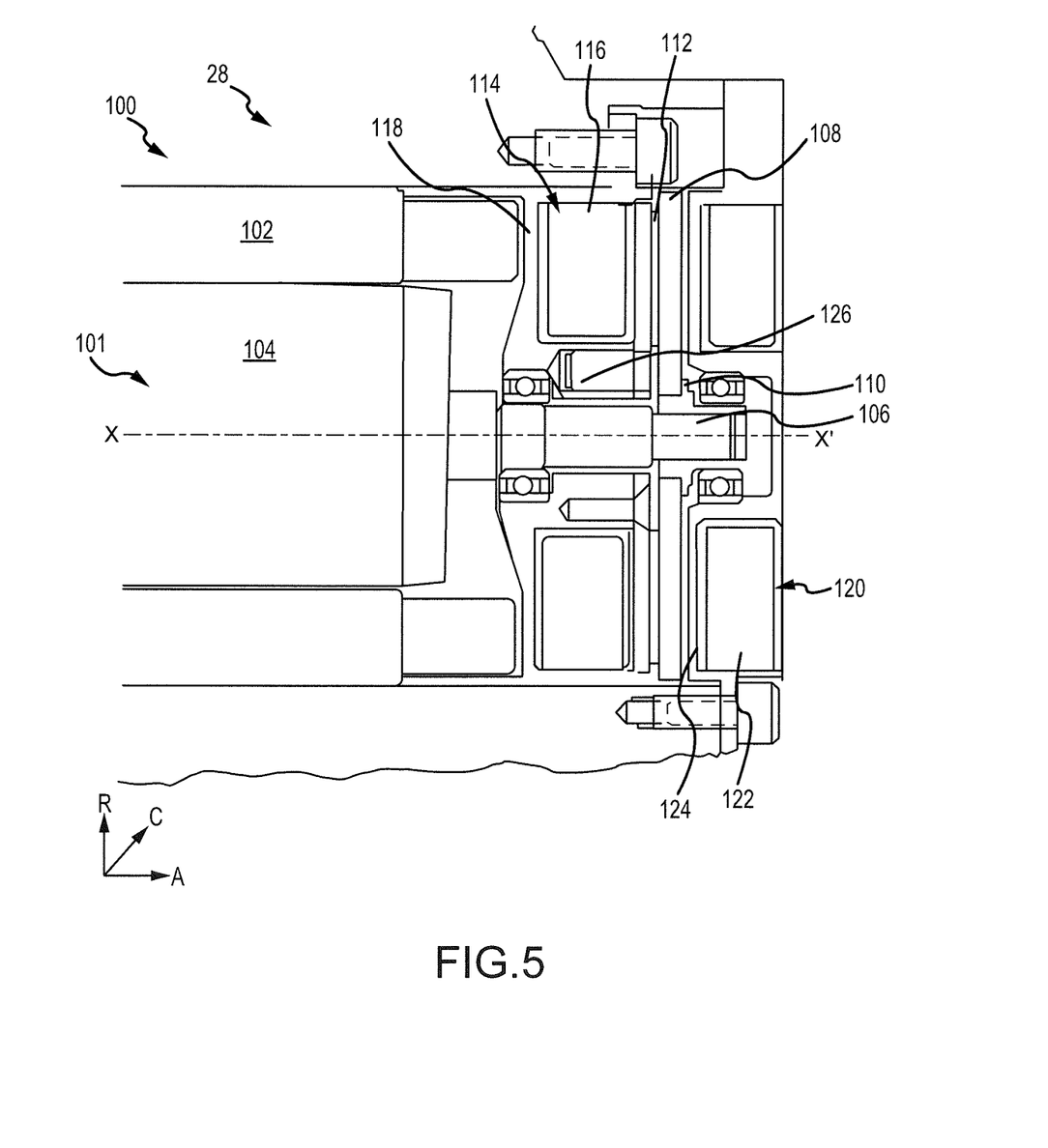
FIG. 5 is a cross-sectional view of a portion of the PDU of FIG. 3 that provides driving and braking force, in accordance with various embodiments.

Referring now to FIG. 5, the PDU 28 may include a motor assembly 101 that includes a motor 100 and a motor shaft 106. An A-R-C axis is shown in FIG. 5 to illustrate the axial, radial, and circumferential directions, respectively. The motor 100 may include one or more stator 102 and one or more rotor 104. At least one of the stator 102 or the rotor 104 may include at least one magnet, and at least one of the stator 102 or the rotor 104 may include coils, or windings. In response to electricity being applied to the coils, or windings, a magnetic flux may be generated which causes the rotor 104 to rotate about an axis X-X' relative to the stator 102, thus generating torque. The motor shaft 106 may be rotatably coupled to the rotor 104 and may rotate along with the rotor 104. In that regard, the torque generated by the motor 100 may be transferred to the motor shaft 106.

The PDU 28 may further include an armature 108. The armature 108 may be rotatably coupled to the motor shaft 106. In various embodiments, the armature 108 may be coupled to the motor shaft 106 via gearing 110. With brief reference to FIGS. 4 and 5, the armature 108 may be further rotatably coupled to one or both of the wheels 51, 52 of the PDU 28. In that regard, torque generated by the motor 100 may transfer to one or both of the wheels 51, 52 via the rotatable connection between the motor shaft 106 and the armature 108, and between the armature 108 and the one or more wheels 51, 52.

The PDU 28 may further include a brake pad 112, a hold solenoid 114, and a release solenoid 120. The hold solenoid 114 may include a hold solenoid coil 116 and a hold solenoid housing 118. The release solenoid 120 may include a release solenoid coil 122 and a release solenoid housing 124.

The brake pad 112 may be located between the armature 108 and the hold solenoid 114, and the armature 108 may be located between the release solenoid 120 and the brake pad 112. In various embodiments, the brake pad 112 may be located adjacent to the armature 108 and designed to contact the armature 108. In various embodiments, the armature 108 and the brake pad 112 are sandwiched between the hold solenoid 114 and the release solenoid 120.

Friction generated between the armature 108 and the brake pad 112 may decelerate or eliminate rotation of the armature 108, thus reducing rotation of the one or more wheel 51, 52. In response to sufficient force between the armature 108 and the brake pad 112, the armature 108 may resist rotation, thus applying a braking force to the one or more wheel 51, 52.

The hold solenoid coil 116 may become energized in response to receiving a first signal (which may include an electrical current). In various embodiments, the first signal may include an analog current (AC) power signal or a direct current (DC) power signal. In response to the hold solenoid coil 116 becoming energized, the hold solenoid coil 116 may apply a first magnetic flux to attract the armature 108, thus urging the armature 108 towards the hold solenoid coil 116 and against the brake pad 112. This urging of the armature 108 against the brake pad 112 increases friction between the armature 108 and the brake pad 112, thus decelerating and potentially stopping rotation of the armature 108 (and thus the one or more wheel 51, 52). This may further reduce the likelihood of the armature 108 (and thus the one or more wheel 51, 52 of FIG. 4) rotating in response to force applied thereto.

In response to full attraction of the armature 108 to the hold solenoid coil 116 (i.e., a brake amount of pressure), the hold solenoid coil 116 may apply a hold braking force to the armature 108 (and, thus, the one or more wheel 51, 52). This hold braking force may be sufficient to significantly increase the difficulty of manipulating a ULD across the one or more wheel 51, 52. In various embodiments, the hold braking force may be sufficient to resist rotation of the armature 108 even in response to the torque being generated by the motor 100.

The release solenoid coil 122 may become energized in response to receiving a second signal (which may include an electrical current). In various embodiments, the second signal may include an alternating current (AC) power signal or a direct current (DC) power signal. In response to the release solenoid coil 122 becoming energized, the release solenoid coil 122 may apply a second magnetic flux to attract the armature 108, thus urging the armature 108 towards the release solenoid coil 122 and away from the brake pad 112. This urging of the armature 108 away from the brake pad 112 reduces or eliminates friction between the armature 108 and the brake pad 112, thus allowing the armature 108 to rotate freely relative to the brake pad 112. In that regard, the motor 100 may freely drive the armature 108 (and the one or more wheel 51, 52). Likewise, the wheels 51, 52 may rotate freely in response to the release solenoid coil 122 becoming energized, allowing a ULD to be manually maneuvered across the non-braked wheels 51, 52.

In various embodiments, the motor 100, the hold solenoid coil 116, and the release solenoid coil 122 may be controlled by the controller 57 of FIG. 3.

In various embodiments, the armature 108 may have minimal contact with the brake pad 112 in response to a lack of power provided to the PDU 28. This minimal contact may allow the wheels 51, 52 to rotate freely or near-freely. This may be undesirable, especially during transport of cargo. In that regard, the PDU 28 further includes a magnet 126.

In various embodiments, the brake pad 112 may be located between the magnet 126 and the armature 108. In various embodiments, the magnet 126 may be located in or on the hold solenoid housing 118, and may be located radially inward from the hold solenoid coil 116. In that regard, the magnet 126 may apply a magnetic force to the armature 108, thus urging the armature 108 towards the brake pad 112. The magnet 126 may compress the armature 108 and the brake pad 112 together by a drag amount, which may be less than the brake amount of pressure applied in response to the hold solenoid coil 116 being energized. In that regard, the magnet 126 may apply a drag braking force to the armature 108 (and thus the one or more wheel 51, 52), and the drag braking force may be less than the hold braking force applied by the hold solenoid coil 116. In various embodiments, the release solenoid coil 122 provides a sufficient attractant force to the armature 108 to overcome the drag braking force. Thus, in response to the release solenoid coil 122 becoming energized, it provides sufficient attraction to the armature 108 so as to reduce or eliminate contact between the armature 108 and the brake pad 112.

Inclusion of the magnet 126 provides an amount of braking regardless of whether the PDU 28 is receiving electrical power. This is beneficial because it is undesirable for ULDs to be able to roll freely about a cargo bay. At the same time, the drag braking force is sufficiently low that a ULD can be manipulated over the wheels 51, 52 by a human operator. Thus, the PDU 28 is designed to both apply a braking force in response to a lack of power received at the PDU while still allowing the aircraft to be loaded with ULDs regardless of whether the PDU 28 is receiving power. This PDU brake configuration reduces a need for passive braking rollers to be distributed within the system.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A power drive unit (PDU) having a magnetic hold brake for use in an aircraft, the PDU comprising:
   a wheel configured to convey cargo through a portion of the aircraft;
   an armature rotatably coupled to the wheel;
   a brake pad;
   a hold solenoid configured to compress the armature against the brake pad by a brake amount in order to apply a hold braking force to the wheel by resisting rotation of the armature;
   a release solenoid configured to apply a force to separate the armature from the brake pad in order to allow the armature to rotate; and
   a magnet configured to compress the armature against the brake pad by a drag amount that is less than the brake amount in order to apply a drag braking force to the wheel by resisting rotation of the armature.

2. The PDU of claim 1, wherein:
   the hold solenoid is configured to compress the armature against the brake pad in response to receiving a first electrical signal;
   the release solenoid is configured to apply the force to separate the armature from the brake pad in response to receiving a second electrical signal; and
   the magnet is configured to compress the armature against the brake pad regardless of whether any element of the PDU is receiving power.

3. The PDU of claim 1, wherein the hold braking force is greater than the drag braking force.

4. The PDU of claim 1, further comprising:
   a motor configured to generate torque; and
   a motor shaft coupled to the motor and the armature and configured to transfer the torque from the motor to the armature.

5. The PDU of claim 4, wherein the hold braking force is sufficient to resist rotation of the wheel regardless of whether the torque is transferred from the motor to the armature.

6. The PDU of claim 1, wherein the hold solenoid further includes a hold solenoid coil and a hold solenoid housing, and the hold solenoid coil and the magnet are located in the hold solenoid housing.

7. The PDU of claim 6, wherein the hold solenoid is positioned about an axis of rotation, and the magnet is located radially inward from the hold solenoid coil.

8. The PDU of claim 1, wherein the brake pad and the armature are sandwiched between the hold solenoid and the release solenoid.

9. The PDU of claim 1, wherein:
the hold solenoid is configured to compress the armature against the brake pad by applying a first magnetic flux to the armature to compress the brake pad between the armature and the hold solenoid; and
the release solenoid is configured to apply the force to separate the armature from the brake pad by applying a second magnetic flux to the armature to urge the armature away from the brake pad.

10. A power drive unit (PDU) having a magnetic hold brake for use in an aircraft, the PDU comprising:
a wheel configured to convey cargo through a portion of the aircraft;
an armature rotatably coupled to the wheel;
a brake pad;
a hold solenoid configured to compress the armature against the brake pad in order to apply a hold braking force to the wheel by resisting rotation of the armature;
a release solenoid configured to apply a force to separate the armature from the brake pad in order to allow the armature to rotate; and
a magnet configured to compress the armature against the brake pad in order to apply a drag braking force to the wheel by resisting rotation of the armature, the hold braking force being greater than the drag braking force.

11. The PDU of claim 10, wherein:
the hold solenoid is configured to compress the armature against the brake pad in response to receiving a first electrical signal;
the release solenoid is configured to apply the force to separate the armature from the brake pad in response to receiving a second electrical signal; and
the magnet is configured to compress the armature against the brake pad regardless of whether any element of the PDU is receiving power.

12. The PDU of claim 10, further comprising:
a motor configured to generate torque; and
a motor shaft coupled to the motor and the armature and configured to transfer the torque from the motor to the armature.

13. The PDU of claim 12, wherein the hold braking force is sufficient to resist rotation of the wheel regardless of whether the torque is transferred from the motor to the armature.

14. The PDU of claim 10, wherein the hold solenoid further includes a hold solenoid coil and a hold solenoid housing, and the hold solenoid coil and the magnet are located in the hold solenoid housing.

15. The PDU of claim 14, wherein the hold solenoid is positioned about an axis of rotation, and the magnet is located radially inward from the hold solenoid coil.

16. The PDU of claim 10, wherein the brake pad and the armature are sandwiched between the hold solenoid and the release solenoid.

17. The PDU of claim 10, wherein:
the hold solenoid is configured to compress the armature against the brake pad by applying a first magnetic flux to the armature to compress the brake pad between the armature and the hold solenoid; and
the release solenoid is configured to apply the force to separate the armature from the brake pad by applying a second magnetic flux to the armature to urge the armature away from the brake pad.

18. A power drive unit (PDU) having a magnetic hold brake for use in an aircraft, the PDU comprising:
a wheel configured to convey cargo through a portion of the aircraft;
an armature rotatably coupled to the wheel;
a motor configured to generate torque;
a motor shaft coupled to the motor and the armature and configured to transfer the torque from the motor to the armature;
a brake pad;
a hold solenoid having a hold solenoid housing and a hold solenoid coil located in the hold solenoid housing and configured to compress the armature against the brake pad by a brake amount in order to apply a hold braking force to the wheel by resisting rotation of the armature;
a release solenoid configured to apply a force to separate the armature from the brake pad in order to allow the armature to rotate; and
a magnet located in the hold solenoid housing and configured to compress the armature against the brake pad by a drag amount that is less than the brake amount in order to apply a drag braking force to the wheel by resisting rotation of the armature.

19. The PDU of claim 18, wherein:
the hold solenoid is configured to compress the armature against the brake pad in response to receiving a first electrical signal;
the release solenoid is configured to apply the force to separate the armature from the brake pad in response to receiving a second electrical signal; and
the magnet is configured to compress the armature against the brake pad regardless of whether any element of the PDU is receiving power.

20. The PDU of claim 18, wherein the hold solenoid is positioned about an axis of rotation, and the magnet is located radially inward from the hold solenoid coil.

* * * * *